Sept. 29, 1942.  A. H. HABERSTUMP  2,297,619

MOTOR COUPLING

Filed Jan. 27, 1940

INVENTOR
Alfred H. Haberstump.
BY
Harness, Dickey & Pierce
ATTORNEYS.

Patented Sept. 29, 1942

2,297,619

UNITED STATES PATENT OFFICE 2,297,619

MOTOR COUPLING

Alfred H. Haberstump, Detroit, Mich., assignor to The Murray Corporation of America, Detroit, Mich., a corporation of Delaware Application January 27, 1940, Serial No. 315,965

2 Claims. (Cl. 64—11)

My invention relates to couplings, and particularly to a new and novel coupling for joining the shaft of a motor to a speed reducing unit or other driven device.

It has been the practice in the art to employ connectors, when the shafts are accurately aligned, which have set screws for positively securing the couplings to each of the shaft ends. While such couplings operated satisfactorily when the shafts were in accurate alignment, a slight misalignment of the shaft caused binding and undue wear on the shaft bearings. V-shaped pulleys or belts were more generally used to provide a drive connection between the motor and device, but while such arrangement had the advantage of varying the relative speeds by using different pulleys, there was also the disadvantage of requiring additional space.

In practicing my invention, I provide a coupling which is made of rubber to compensate for any misalignment in the shafts. The body portion is resilient so that the rubber may distort and avoid applying any undue pressure on the shaft bearings. A pair of washers are mounted in each end of the coupling, having a D-shaped central opening and spaced projections on the outer periphery.

Pairs of washers are embedded in hard rubber which is vulcanized to the washers and to the ends of the resilient central portion of the coupling. The central opening through the rubber is smaller than the opening through the washers so that the shaft is tightly gripped by the rubber to prevent play and movement which might produce noise. The coupling is held in position on the shaft by the gripping of the shaft by the rubber and by the clamping of the motor and the device driven to a base.

Accordingly, the main objects of my invention are; to provide a coupling for shafts which is made of resilient rubber and secured to a shaft thereby; to provide the ends of a resilient rubber coupling with washers having D-shaped openings which engage the flat side of the shafts to provide a driving connection thereto; to imbed the washers of the coupling in hard rubber which is vulcanized thereto and to the ends of the resilient rubber portion; to provide a central opening through the resilient rubber body portion of a coupling which is of smaller diameter than the diameter of the washer to provide gripping and holding means for the shafts; and in general, to provide a coupling for aligned shafts, which is resilient to eliminate stress on the shaft bearing, which is simple in construction, and economical of manufacture.

Other objects and features of novelty of my invention will be either specifically pointed out or will become apparent when referring, for a better understanding of my invention, to the following description taken in conjunction with the accompanying drawing, wherein.

Figure 1:
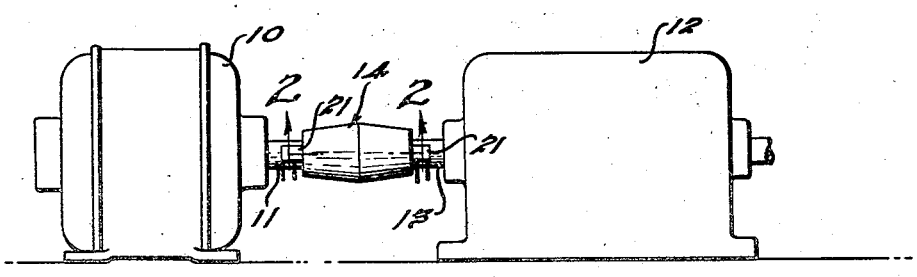
Figure 1 is a view in elevation of a motor and speed reducing unit, the shafts of which are joined by a coupling, embodying features of my invention.
Figure 2:
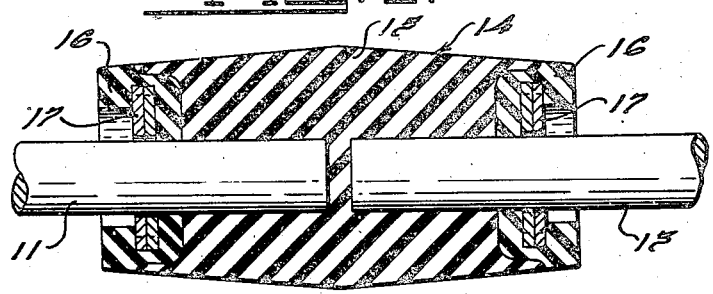
Fig. 2 is an enlarged sectional view of a coupling illustrated in Fig. 1, taken on the line 2—2 thereof.
Figure 3:
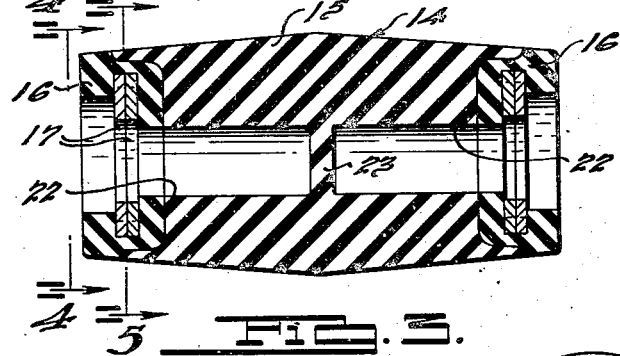
Fig. 3 is a view of the coupling illustrated in Fig. 2 before attachment to the shafts.
Figure 5:
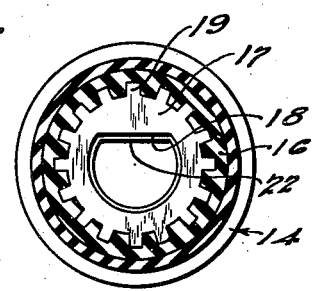

In Fig. 1, I have illustrated a motor 10 having a shaft 11 connected to a shaft 13 of a speed reducing unit 12 by a coupling 14 embodying features of my invention. The coupling 14 comprises a central body portion 15 made of resilient rubber while hard rubber ends 16 are vulcanized thereto and to washers 17 which are imbedded therein. The washers, as illustrated in Fig. 5, are made of metal and provided with a D-shaped central aperture 18 and with spaced projections 19 at the peripheral edges. The projections 19, which are vulcanized to the hard rubber end portions 16, prevent the relative turning of the washers and the rubber in addition to the resistance to turning provided by vulcanization.

Figure 4:
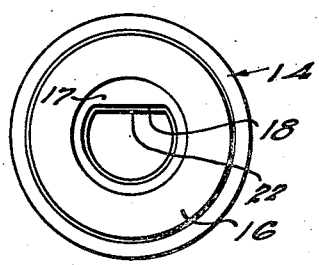
Fig. 4 is an end view of the structure illustrated in Fig. 3, viewed from the line 4—4 thereof; and, Fig. 5 is an enlarged sectional view of the structure illustrated in Fig. 3, taken on the line 5—5 thereof.

The D-shaped apertures 18 snugly fit the ends of the shafts 11 and 13 which are provided with flat portions 21 as illustrated in Fig. 1. The rubber body portion 15 and the end portion 16 have a central aperture 22 which is of D-shape cross section and of less diameter than the diameters of the D-shaped openings 18 provided in the washers. This projection of the rubber beyond the contour of the opening 18 is illustrated in Figs. 4 and 5. The aperture 22 has a central web 23 which prevents the ends of the shaft from abutting.

It will be noted that my particular coupling requires no screws or other holding means requiring adjustment to attach the coupling to the ends of the shafts. Even though the openings 18 are slightly larger than the shaft the gripping of the shafts by the rubber forming the wall of the aperture 22 will retain the coupling tight on the shaft to prevent noise which would otherwise occur if such a gripping action were not provided. When assembling the coupling on the shafts it is only necessary to insert the shafts through the washers into the apertures 22 to secure the motor and speed reducing unit, or other device, on a base to retain the coupling in position. The clamping of the two units does not require extreme accuracy as the shafts need not be in exact alignment, as any variation of the alignment will be overcome through the resiliency of the body portion 15 of the coupling.

The coupling is simple in construction and positive in performance in driving one shaft by another when the shafts are in substantially aligned relation. The pair of washers are imbedded at each end of the coupling in hard rubber and assembled on a softer rubber central mass and the entire unit is vulcanized together in a single operation. By having the diameter of the aperture 22 of the rubber reduced from that of the apertures 18 in the washers, the shafts are tightly gripped by the rubber and any noise which might otherwise occur is thereby eliminated.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. In a coupling for a pair of substantially aligned shafts, in combination, a pair of end washers having D-shaped openings and corrugated peripheries, hard rubber end portions encompassing the peripheral portion of said washers, and a resilient rubber body portion disposed intermediate of said hard rubber end portions forming a unit construction.

2. In a coupling for a pair of substantially aligned shafts, in combination, a pair of end washers having D-shaped openings and corrugated peripheries, hard rubber end portions encompassing the peripheral portion of said washers, and a resilient rubber body portion disposed intermediate of said hard rubber end portions forming a unit construction, said resilient rubber body portion having central apertures aligned with the openings in the washers which are of less diameter than the diameter of the openings in the washers.

ALFRED H. HABERSTUMP.